March 10, 1942.    J. F. ALEXANDER    2,275,834
ANTISKID APPARATUS
Filed Jan. 30, 1941
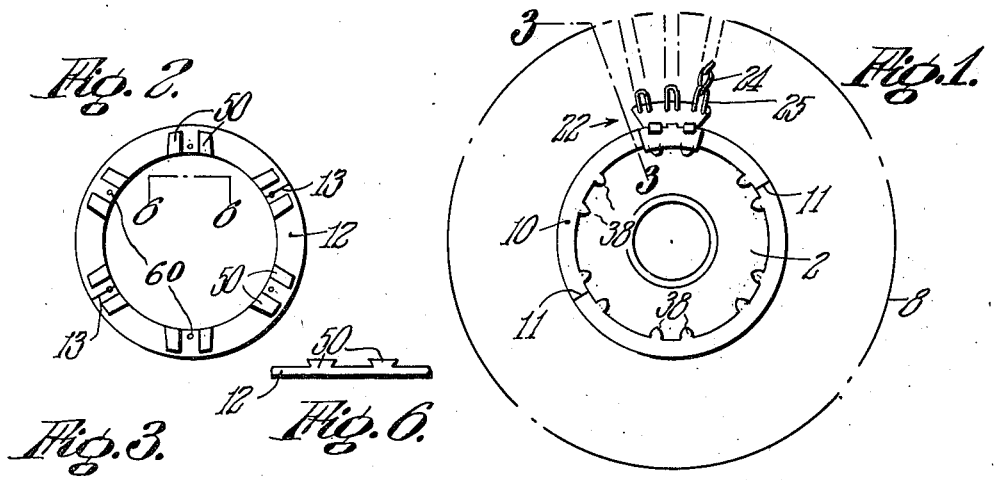
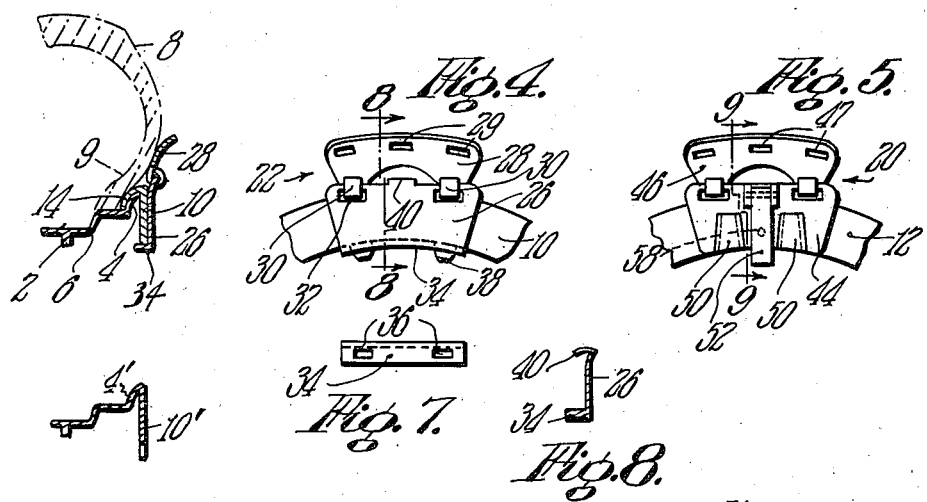
INVENTOR.
James F. Alexander
BY
Walter C. Roy, Attorney.

Patented Mar. 10, 1942

2,275,834

UNITED STATES PATENT OFFICE 2,275,834

ANTISKID APPARATUS

James F. Alexander, Indian Orchard, Mass.

Application January 30, 1941, Serial No. 376,573

5 Claims. (Cl. 152—237)

This invention relates to improvements in anti-skid apparatus for vehicle wheels and is directed more particularly to improvements in anti-skid apparatus for automobiles, trucks, tractors, trailers and the like.

The principal objects of the invention are directed to the provision of anti-skid apparatus that is easily and quickly associated with a wheel and that is efficient in its operation. The construction of the apparatus of the invention is adapted for broad application so that with changes and modifications within the scope of the invention it may be used with the wheels of any type vehicle.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Fig. 1 is a side elevational view of a wheel having the novel features of the invention associated therewith, the tire being represented in dot-dash lines;

Fig. 2 is a plan or side view of a ring forming a part of the invention for the opposite side of the wheel from that shown in Fig. 1;

Fig. 3 is a partial sectional elevational view on the line 3—3 of Fig. 1;

Figs. 4 and 5 are plan views of the cross chain plates of the invention;

Fig. 6 is an edge view of one of the side rings on the line 6—6 of Fig. 2;

Fig. 7 is an edge view of the plate shown in Fig. 4;

Fig. 8 is a sectional elevational view on the line 8—8 of Fig. 4;

Fig. 9 is a sectional elevational view on the line 9—9 of Fig. 5; and

Fig. 10 is a view similar to Fig. 3 showing how the side rings may be made integral with the wheel.

Referring now to the drawing more in detail, wherein similar reference figures refer to like parts, and referring more particularly to the preferred form of my invention which has been selected for illustrative purposes, I have shown a wheel represented by 2 which has side and lower wall members 4 and 6 providing a circumferential channel for a tire which is shown in dot-dash lines 8.

The anti-skid apparatus includes side rings 10 and 12. Either one or the other may be the front or rear ring but for clearness the ring 10 may be called the rear ring while the ring 12 may be called the front ring. The rings 10 and 12 are preferably split at 11 and 13.

These rings 10 and 12 have inwardly and downwardly extending peripheral parts such as 14 in Fig. 3 which lie between the wheel parts such as 4 and adjacent side wall or bead part 9 of the tire 8. When the half-parts of the rings are slipped on to the wheel parts with the tire partly deflated the tire is then inflated so that the ring parts are held in place between the tire and wheel part. The ring construction described provides separate parts readily and easily assembled with the wheel.

When desired rings such as 10' may be integral with the side parts 4' of the wheel as shown in Fig. 10. It will be understood that there will be another ring corresponding to ring 12 integral with the other side of the wheel, not shown.

Plates 20 and 22 which may be called front and rear plates are provided that have cross chains 24 connecting them so as to provide units each consisting of a pair of plates and cross chains.

The rear plates have main plate sections 26 to which are hinged outer sections 28 by means of hook parts 30 extending through openings 32, as shown. The sections 26 have inwardly extending lips 34 provided with openings 36, see Fig. 4, which receive inwardly extending radial prongs 38 of the ring 10. Lips 40 on the plates 26 extend inwardly at their upper sides as in Fig. 8. These lips 40 may be more or less yieldable so as to yieldingly engage or snap into recesses provided but not shown on the outer periphery of ring 10.

The plates 20 have main sections 44 to which are hinged, as with the plates 22, other sections 46. The plate sections 28 and 46 are arranged to flare outwardly as in Fig. 3 and are provided with openings 29 and 47 to receive end hooks 25 of the cross chains.

Pairs of blocks 50 are provided on the outer side of ring 12. The outer sides of the blocks of a pair are angularly disposed as shown in Fig. 2, and the radially extending sides of said blocks are undercut, as illustrated in Fig. 6.

The plate sections 44 are provided with slots having radially disposed sides that are complemental to and receive the sides of the blocks 50.

Latches 52 pivoted to ears 54 of plates 44 have pins 56, see Fig. 9, that are receivable in openings 58 in plate sections 44 and in openings 60 in ring 12. Ears 62 on the latches are arranged to conform to and yieldingly and frictionally engage the inner periphery of the ring 12 when in locking position with the plates 20 on ring 12.

With the rings in place at the sides of the tire whether integral with the wheel or separate therefrom, a plate 22 is secured to the ring 10 by engaging the prongs 38 of the ring in the openings 36 of the plate section 26. The plate section 26 is pressed against the ring 10 so that projection 40 enters the recess provided in the periphery of the ring therefor.

The cross chains are brought around the tread of the tire and plate section 44 of plate 20 is assembled with ring 12 by moving the said plate section radially and inwardly of and on said ring to cause the parts 50 to be engaged in the recesses provided therefor in the plate section 44. When in position the latch 52 is swung downwardly so that pin enters opening 58 of plate section 44 and opening 60 of ring 12 so that lug 62 of the latch engages the inner periphery of said ring 12. This plate section 44 is releasably locked in place on the ring with the cross chains extending around the tire and plate 22 secured to ring 10.

It will be observed that the cross chain units may be readily and easily applied so as to be as easily and readily removed while cross chains may be quickly and easily replaced.

There may be as many cross chain assemblies as may be desired and as many sections to the rings as may be desired when they are not integral with the wheel. It will be appreciated that the rings may be associated with the wheels at all times while the cross chains may be used when and as desired.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Anti-skid apparatus for a vehicle wheel comprising, separate annulus members for securing to opposite sides of a wheel, sets of plate assemblies for detachably securing to said annulus members, each plate assembly including a main section for detachably being secured to its respective annulus member and outer sections hinged thereto, and chains for overlying a tire extending between the outer sections of the plate assemblies, all adapted and arranged whereby when the annulus members are secured to a wheel with the plate assemblies secured to the annulus members and the chains overlying a tire the outer hinged sections of a plate assembly may swing relatively outwardly into diverging relation.

2. Anti-skid apparatus for a vehicle wheel comprising, separate front and rear ring members for securing to opposite sides of a wheel, sets of front and rear plate assemblies each including main sections and outer sections hinged thereto, engageable means associated with the main sections and their respective rings for detachably securing said main sections thereto, and chains for overlying a tire extending between the outer sections of each set, the engageable means associated with the rear ring and main sections of the rear plate assemblies having parts for overlying the inner portion of the rear ring provided with openings receiving prongs provided on said ring and portions overlying the outer portion of said ring.

3. Anti-skid apparatus for a vehicle wheel comprising, separate front and rear ring members for securing to opposite sides of a wheel, sets of front and rear plate assemblies each including main sections and outer sections hinged thereto, engageable means associated with the main sections and their respective rings for detachably securing said main sections thereto, and chains for overlying a tire extending between the outer sections of each set, the engageable means associated with the front ring and main sections of the front plate assemblies including blocks on the outer face of the ring and the said main sections having slots slidably receiving said blocks.

4. Anti-skid apparatus for a vehicle wheel comprising, separate front and rear ring members for securing to opposite sides of a wheel, sets of front and rear plate assemblies each including main sections and outer sections hinged thereto, engageable means associated with the main sections and their respective rings for detachably securing said main sections thereto, and chains for overlying a tire extending between the outer sections of each set, the engageable means associated with the front ring and main sections of the front plate assemblies including blocks on the outer face of the ring and the said main sections having slots slidably receiving said blocks, and latches pivoted on said main sections engageable with said front ring.

5. Anti-skid apparatus comprising in combination, rear and front ring members for securing to opposite sides of a wheel on which is mounted a tire, a prong extending radially inwardly of the rear ring, a rear plate assembly, chain means having one end secured thereto and extending upwardly therefrom, a part of said plate assembly having an opening for receiving said prong whereby said plate assembly is held against outward movement relative movement as said chain means is disposed upwardly and over a tire, a front plate assembly having its outer end secured to the other end of said chain means, blocks on said front ring and said front plate provided with slots in which said blocks are receivable, and latch means on said front plate engageable to detachably secure said plate to said ring.

JAMES F. ALEXANDER.